(12) United States Patent
Hanyu

(10) Patent No.: US 8,320,082 B2
(45) Date of Patent: Nov. 27, 2012

(54) HEAD WITH GUIDE GROOVE IN CENTER RAIL AND RIBS EXTENDING ALONG AIR INTAKE GROOVE AND DISK DEVICE WITH THE SAME

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/174,496

(22) Filed: Jun. 30, 2011

(65) Prior Publication Data

US 2012/0002327 A1  Jan. 5, 2012

(30) Foreign Application Priority Data

Jun. 30, 2010 (JP) ................. 2010-150040

(51) Int. Cl.
- *G11B 5/60* (2006.01)
- *G11B 15/64* (2006.01)
- *G11B 17/32* (2006.01)

(52) U.S. Cl. ............... 360/236.2; 360/235.8; 360/235.6
(58) Field of Classification Search ............... 360/235.8, 360/235.6, 236.2, 236.3
See application file for complete search history.

(56) References Cited

U.S. PATENT DOCUMENTS

| | | | |
|---|---|---|---|
| 5,568,981 A | 10/1996 | Nepela et al. | |
| RE35,800 E | 5/1998 | Chapin | |
| 6,130,808 A | 10/2000 | Yotsuya | |
| 6,809,904 B2 * | 10/2004 | Boutaghou et al. | 360/235.8 |
| 6,989,967 B2 * | 1/2006 | Pendray et al. | 360/236.5 |
| 7,230,797 B1 * | 6/2007 | Liu | 360/235.8 |
| 7,262,937 B2 * | 8/2007 | Pendray et al. | 360/235.1 |
| 7,499,245 B2 | 3/2009 | Ueda | |
| 7,751,147 B2 * | 7/2010 | Dorius et al. | 360/235.8 |
| 7,898,769 B2 * | 3/2011 | Bolasna et al. | 360/236.2 |
| 8,116,037 B2 * | 2/2012 | Kohira et al. | 360/235.7 |
| 2003/0058578 A1 * | 3/2003 | Boutaghou et al. | 360/235.8 |
| 2004/0027724 A1 | 2/2004 | Pendray et al. | |

(Continued)

FOREIGN PATENT DOCUMENTS

JP  H07-085624  3/1995

(Continued)

OTHER PUBLICATIONS

Chhabra et al, "Air Bearing Design Considerations for Constant Fly Height Applications", IEEE Trans. Magnetics, v. 30, No. 2, pp. 417-423, Mar. 1994.*

(Continued)

*Primary Examiner* — Julie Anne Watko
(74) *Attorney, Agent, or Firm* — Knobbe, Martens, Olson & Bear, LLP

(57) ABSTRACT

According to one embodiment, a head includes a slider and a head section on the slider. A supporting surface of the slider includes a leading step in an inflow side of airflow, a leading pad on the leading step, a negative-pressure cavity in a downstream side of the leading pad, a trailing step in an outflow end side of the airflow, a center rail extending from the leading step to the trailing step, a guide groove in the center rail, configured to guide the airflow to the trailing step, and an intake groove formed in the leading pad, extending in a direction transverse to the airflow, communicating with the guide groove, and includes two end parts in its longitudinal direction, the two end parts extending in a direction of the airflow and forming openings open to the inflow side of the leading pad.

14 Claims, 14 Drawing Sheets

U.S. PATENT DOCUMENTS

| | | | |
|---|---|---|---|
| 2006/0176616 A1 | 8/2006 | Ueda et al. | |
| 2006/0268460 A1* | 11/2006 | Kondo | 360/235.8 |
| 2007/0047143 A1 | 3/2007 | Matsumoto | |
| 2010/0149692 A1 | 6/2010 | Fujimaki et al. | |

FOREIGN PATENT DOCUMENTS

| | | |
|---|---|---|
| JP | H08-297828 | 11/1996 |
| JP | H10-064034 | 3/1998 |
| JP | 2004-071140 | 3/2004 |
| JP | 4125189 | 3/2004 |
| JP | 2006-216108 | 8/2006 |
| JP | 2007-066422 | 3/2007 |
| JP | 4041509 | 3/2007 |
| JP | 2009-076183 | 4/2009 |
| JP | 2009-301701 | 12/2009 |
| JP | 2010-140588 | 6/2010 |

OTHER PUBLICATIONS

Kojima et al, "Flying characteristics of a novel negative pressure slider 'Papillon'", J. Appl. Phys. v. 81, No. 8, pp. 5399-5401, Apr. 15, 1997.*

Yong et al, "Dynamic Stability and Spacing Modulation of Sub-25 nm Fly Height Sliders", Trans. ASME J. Tribology, vol. 119, pp. 646-652, Oct. 1997.*

Yong et al, "Partial Contact Air Bearing Characteristics of Tripad Sliders for Proximity Recording", Trans. ASME J. Tribology, v. 120, pp. 272-279, Apr. 1998.*

Japanese Office Action dated Nov. 8, 2010 for Japanese App. No. 2010-150040.

Information Sheet for preparing an Information Disclosure Statement, undated in two pages.

* cited by examiner

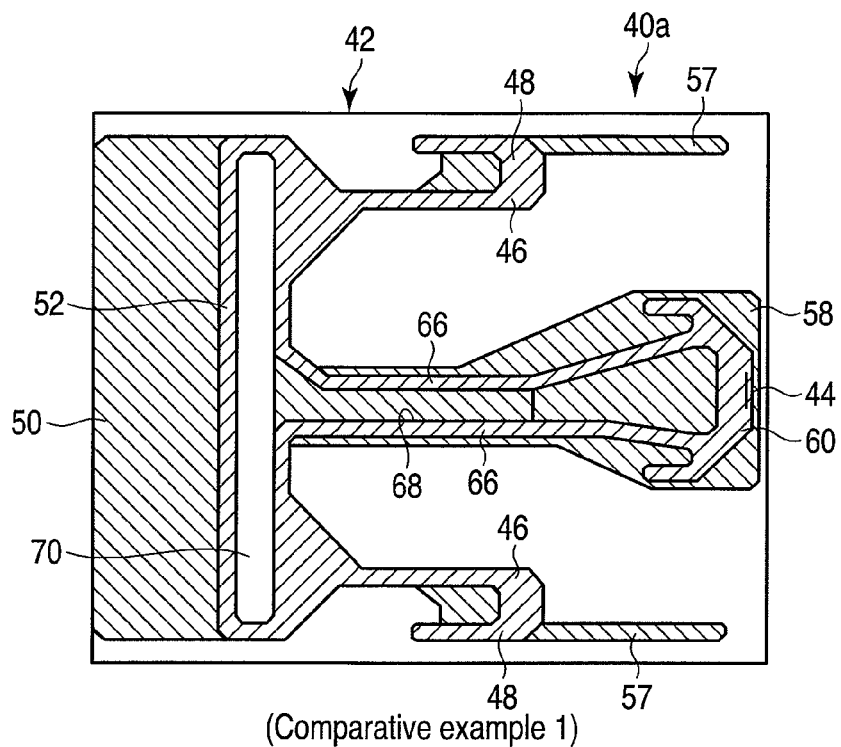
(Comparative example 1)
F I G. 5
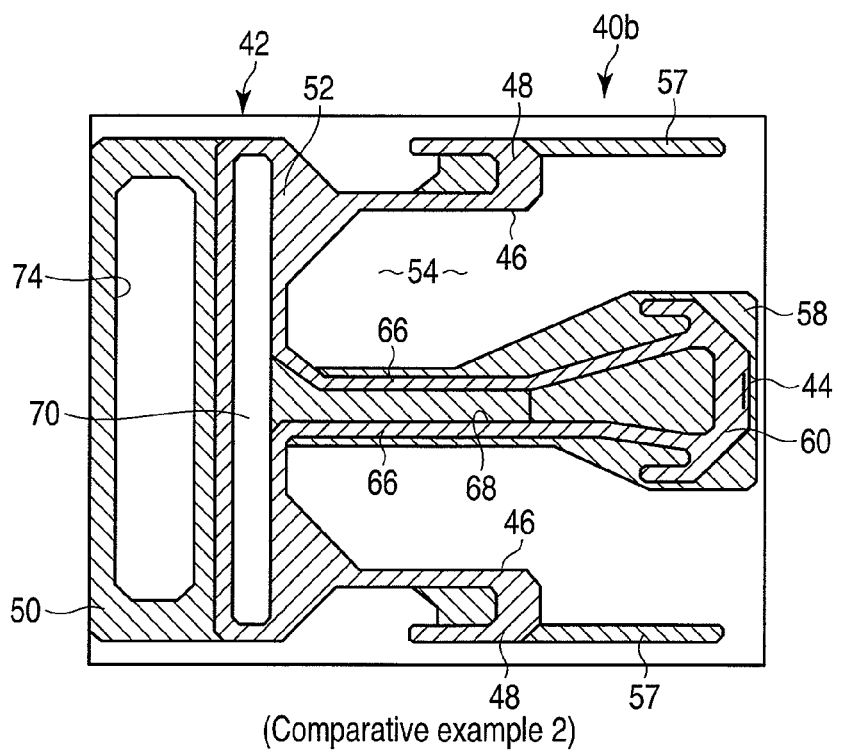
(Comparative example 2)
F I G. 6

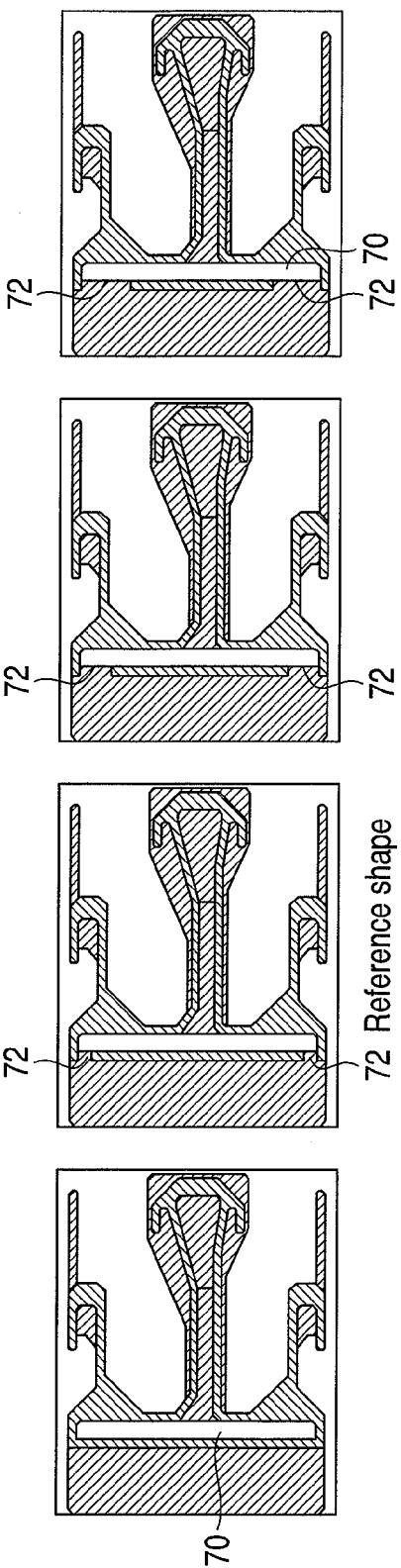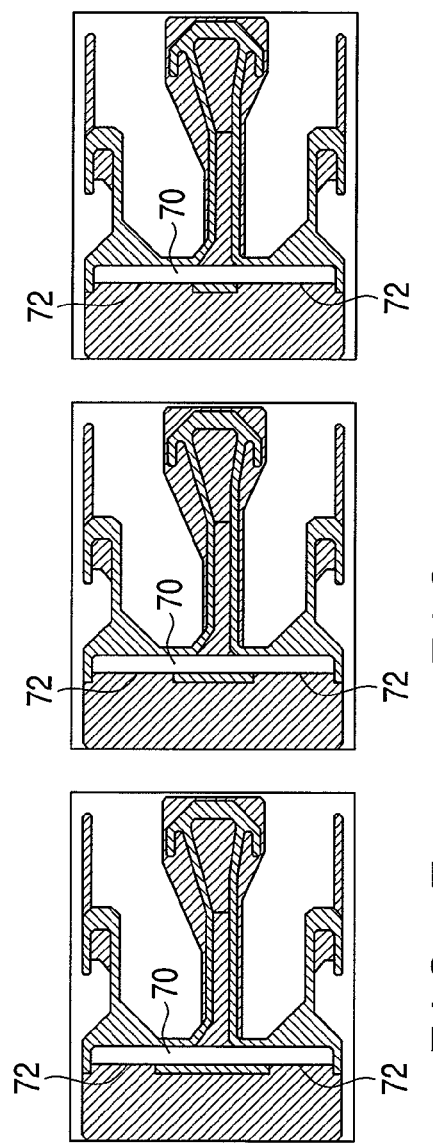

Reference shape

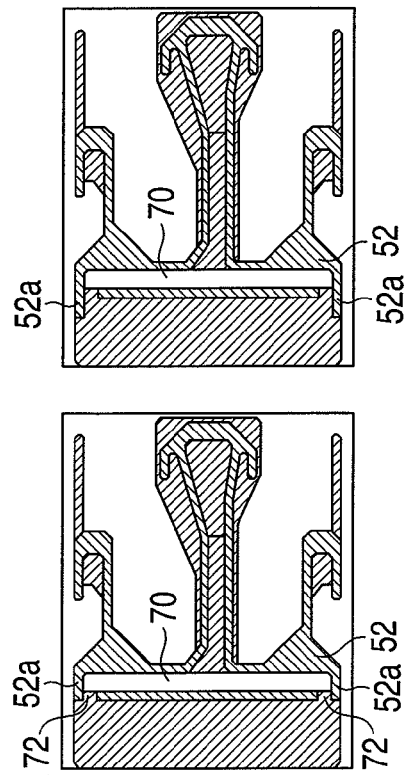
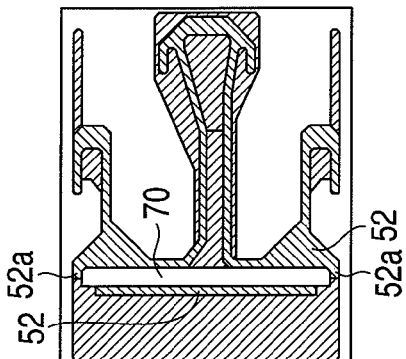
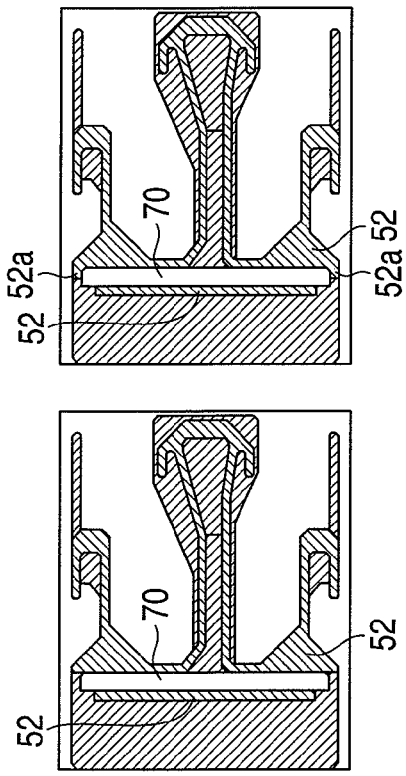
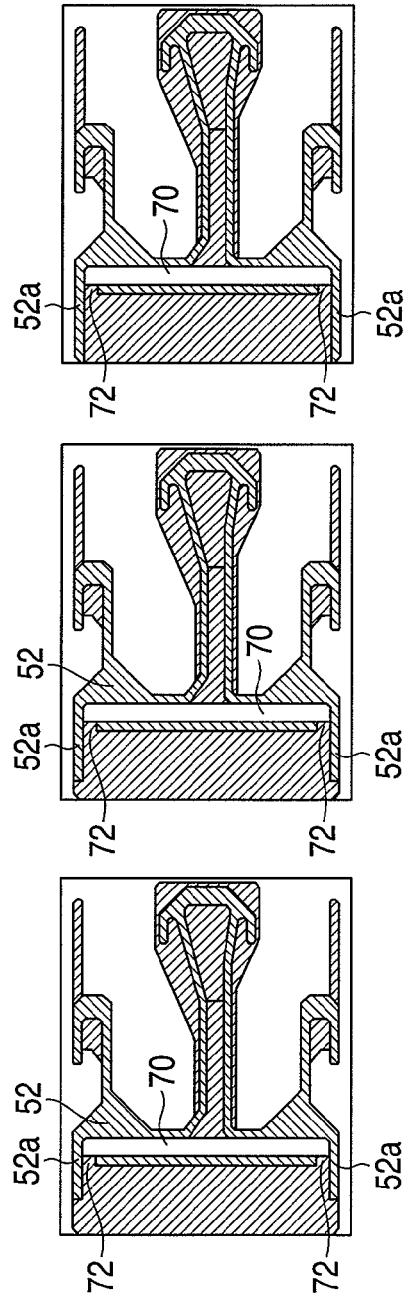

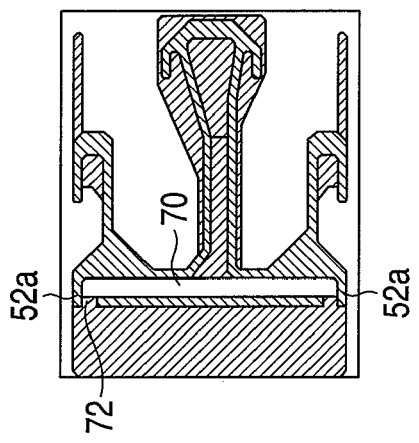
FIG. 12A Reference shape
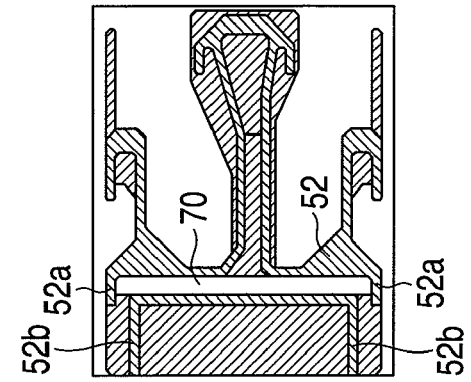
FIG. 12E
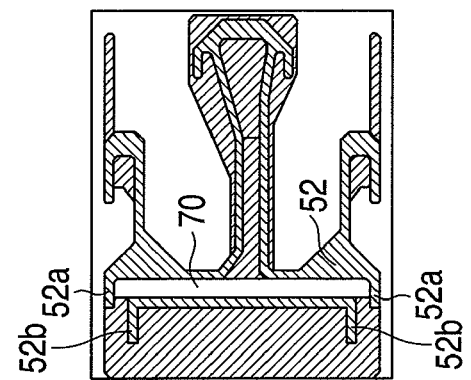
FIG. 12D
FIG. 12C
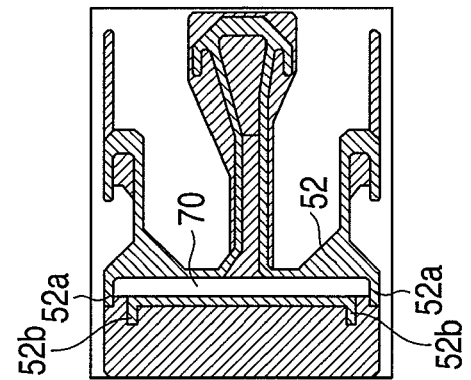
FIG. 12B

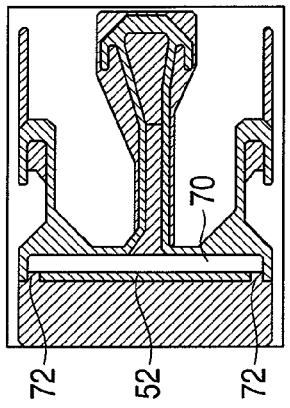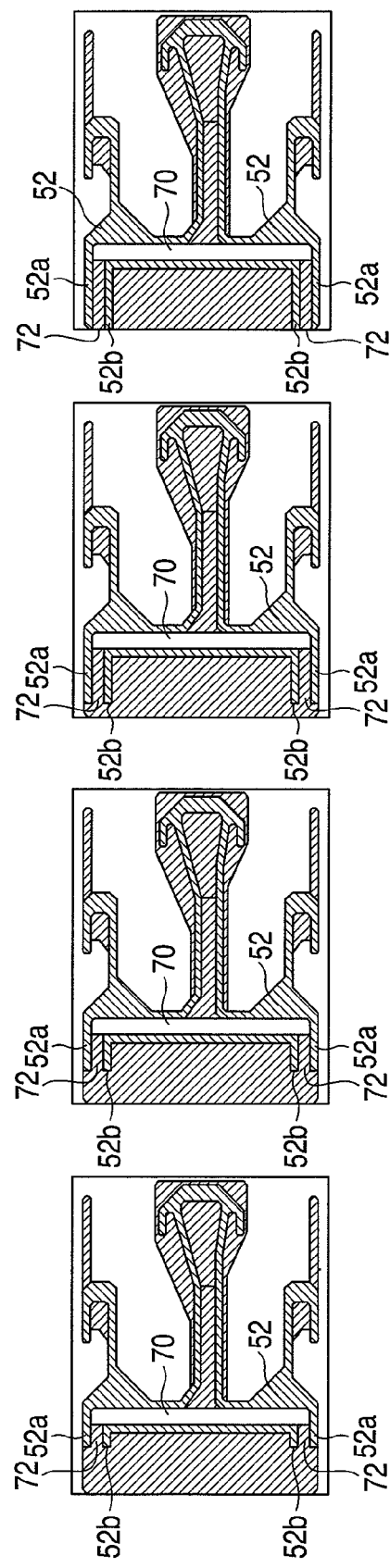

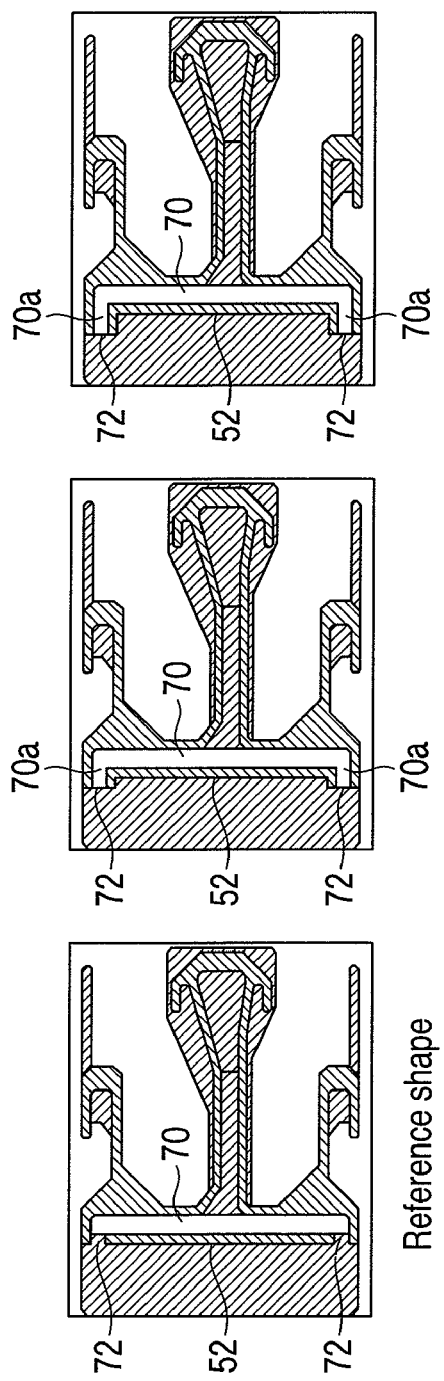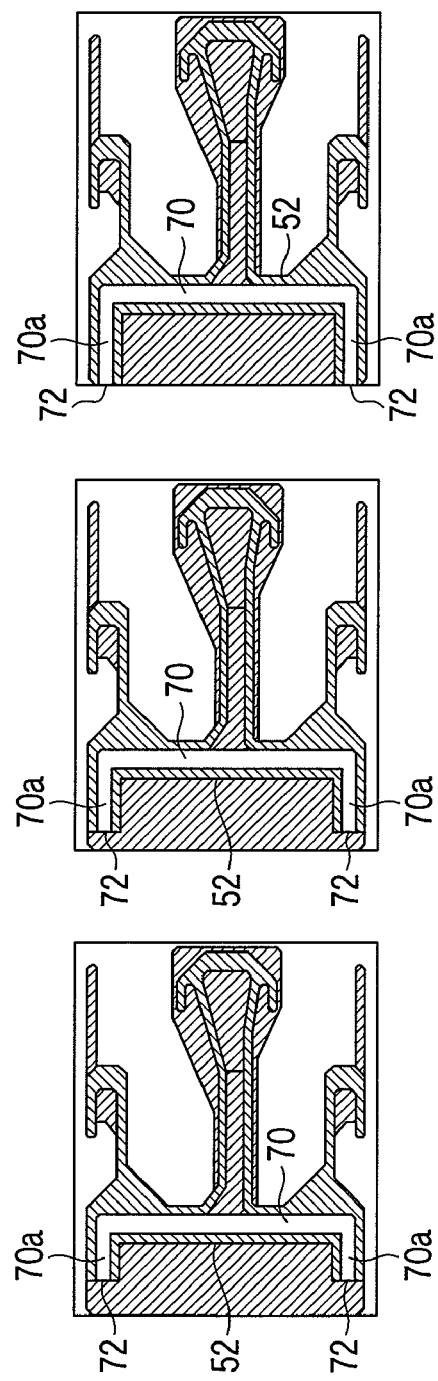

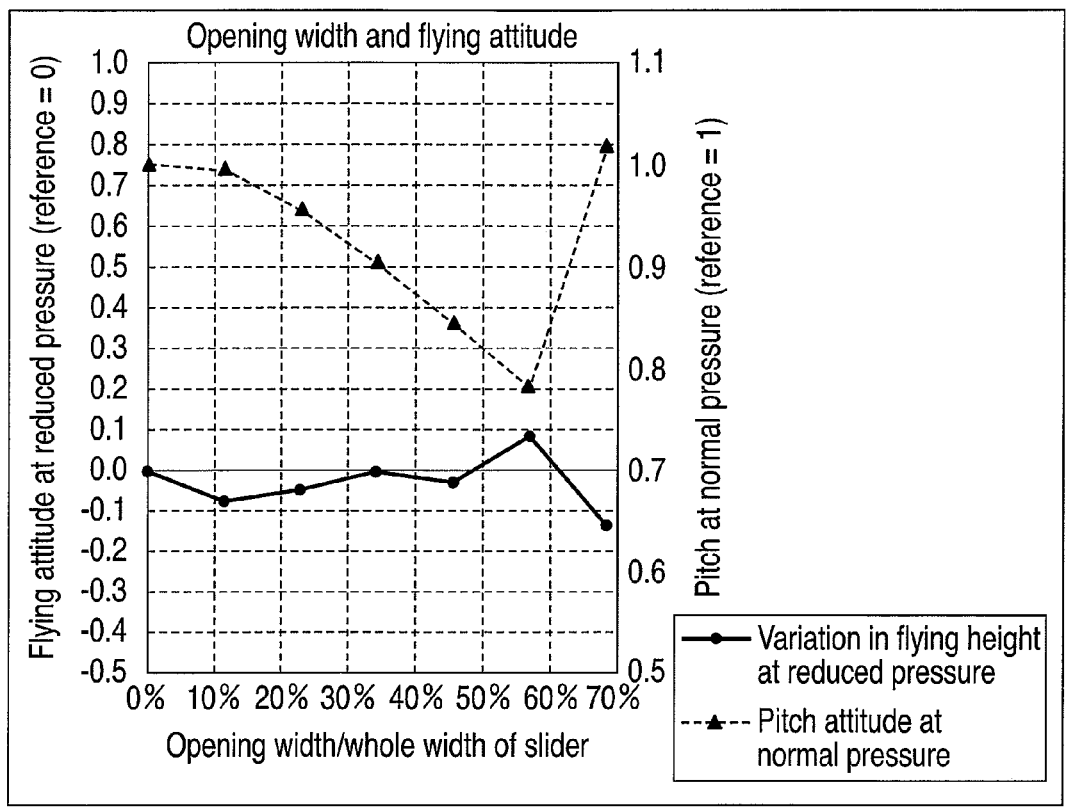
F I G. 15
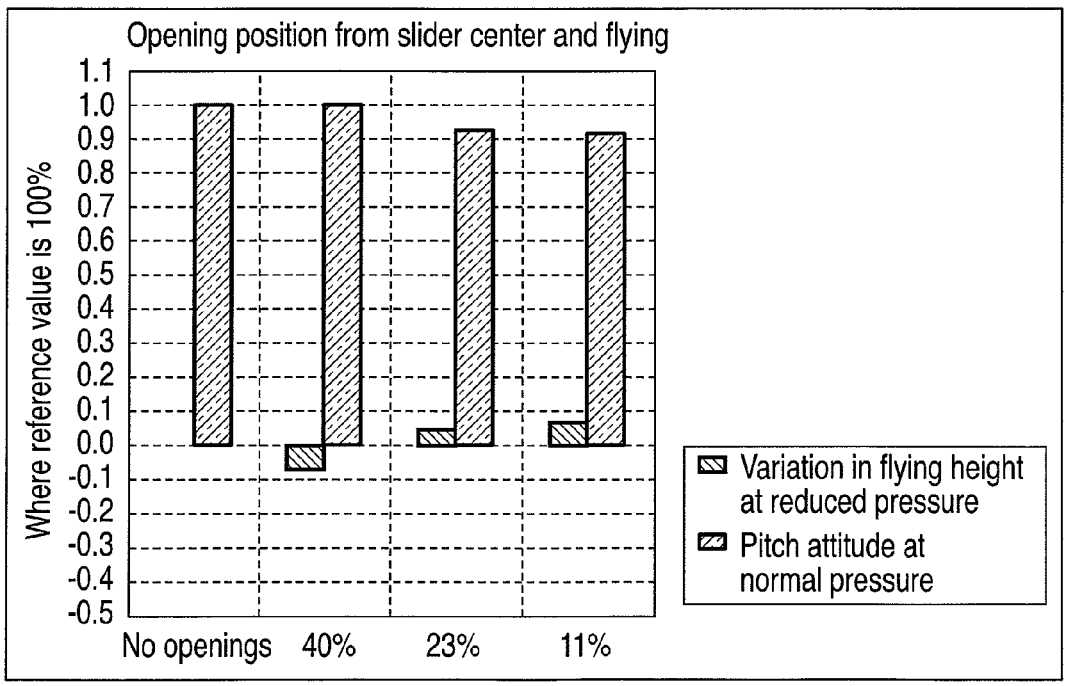
F I G. 16

US 8,320,082 B2

HEAD WITH GUIDE GROOVE IN CENTER RAIL AND RIBS EXTENDING ALONG AIR INTAKE GROOVE AND DISK DEVICE WITH THE SAME

CROSS-REFERENCE TO RELATED APPLICATIONS

This application is based upon and claims the benefit of priority from Japanese Patent Application No. 2010-150040, filed Jun. 30, 2010, the entire contents of which are incorporated herein by reference.

FIELD

Embodiments described herein relate generally to a head for use in a disk device such as a magnetic disk device, and a disk device comprising the head.

BACKGROUND

A disk device, such as a magnetic disk device, comprises a magnetic disk, a spindle motor, a magnetic head, and a carriage assembly. The magnetic disk is provided in a base. The spindle motor drives the magnetic disk to rotate. The magnetic head reads/writes data from/to the magnetic disk. The carriage assembly supports the magnetic head to be freely movable in relation to the magnetic disk. The carriage assembly comprises an arm supported to be rotatable, and a suspension extending from the arm. A magnetic head is supported at a distal end of the suspension. The magnetic head comprises a slider attached to the suspension, and a head section provided on the slider. The head section is configured to comprise a reproduction element used for reproduction, and a recording element for recording.

The slider comprises a supporting surface (air bearing surface [ABS]) which faces a recording surface of the magnetic disk. When the magnetic disk device operates, airflow is produced between the rotating magnetic disk and the slider, and a force (positive pressure) which causes the slider to fly above the magnetic acts on the supporting surface, based on principle of air lubrication. By balancing the flying force and a head load, the slider flies up at a gap maintained from a recording surface of the magnetic disk.

In recent years, a slider comprising a center-rail-type ABS has been proposed as a slider for a magnetic head. This slider is designed such that a groove which guides airflow from an air inflow end to an air outflow side is provided along the center axis of the slider, to increase a pressure generated by a pad in the outflow side. In this manner, the characteristics of the slider are improved, e.g., flying height at reduced pressure and vibration of the slider due to sudden disturbance are reduced.

In the slider comprising a center-rail-type ABS, a flow rate of air collected in the groove increases to be greater owing to a structure of the slider when the slider is positioned in an intermediate peripheral area of a magnetic disk than when in an inner or outer peripheral area. Accordingly, the pressure generated by outflow pads increases to be higher, and the flying height of the slider therefore increases in the intermediate peripheral area of the magnetic disk. As a result, profiles of the flying height of the magnetic head at reduced pressure are difficult to be uniform between the inner, intermediate, and outer peripheral areas. Consequently, the flying height of the magnetic head varies depending on the radial position relative to the magnetic disk. Therefore, stable recording/reading characteristics are difficult to obtain.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary plan view showing a slider according to a comparative example 1;

FIG. 6 is an exemplary plan view showing a slider according to a comparative example 2;

FIGS. 9A, 9B, 9C, 9D, 9E, 9F and 9G are exemplary plan views showing plural sliders whose openings formed in leading pads have respectively different lengths in width directions;

FIGS. 11A, 11B, 11C, 11D, 11E, 11F and 11G are exemplary plan views showing plural sliders whose leading pads have respectively different extending lengths in intermediate parts of the leading pads in width directions;

FIGS. 12A, 12B, 12C, 12D and 12E are exemplary plan views showing plural sliders whose leading pads have respectively different extending lengths in intermediate parts of the leading pads in width directions;

FIGS. 13A, 13B, 13C, 13D and 13E are exemplary plan views showing plural sliders whose leading pads are compared with each other, while variously changing extending lengths of two end parts and intermediate parts of the leading pads in width directions;

FIGS. 14A, 14B, 14C, 14D, 14E and 14F are exemplary plan views showing plural sliders whose leading pads are compared with each other, while variously changing extending lengths of two end parts and intermediate parts of the leading pads, and extending lengths of two end parts of intake grooves;

FIG. 15 is an exemplary graph showing a relationship between widths of openings and flying attitudes of a slider;

FIG. 16 is an exemplary graph showing results of evaluating a relationship between widths of openings and flying attitudes of a slider, based on a reference value;

DETAILED DESCRIPTION

Various embodiments will be described hereinafter with reference to the accompanying drawings.

In general, according to one embodiment, a head comprises a slider comprising a supporting surface opposed to a surface of a rotatable recording medium, and a head section on the slider, configured to perform recording/reproduction of data on/from the recording medium. The supporting surface of the slider comprises: a leading step in an inflow side of airflow; a leading pad on the leading step; a negative-pressure cavity in a downstream side of the leading pad in relation to airflow; a trailing step in an outflow end side of the airflow and provided with the head section; a center rail extending from the leading step to the trailing step; a guide groove in the center rail, configured to guide the airflow to the trailing step; and an intake groove formed in the leading pad, extending in a direction transverse to the airflow, communicating with the guide groove, and comprising two end parts in its longitudinal direction, the two end parts extending in a direction of the airflow and forming openings open to the inflow side of the leading pad.

Hereinafter, an embodiment which applies a disk device to a hard disk drive (HDD) will be described in detail.

Figure 1:
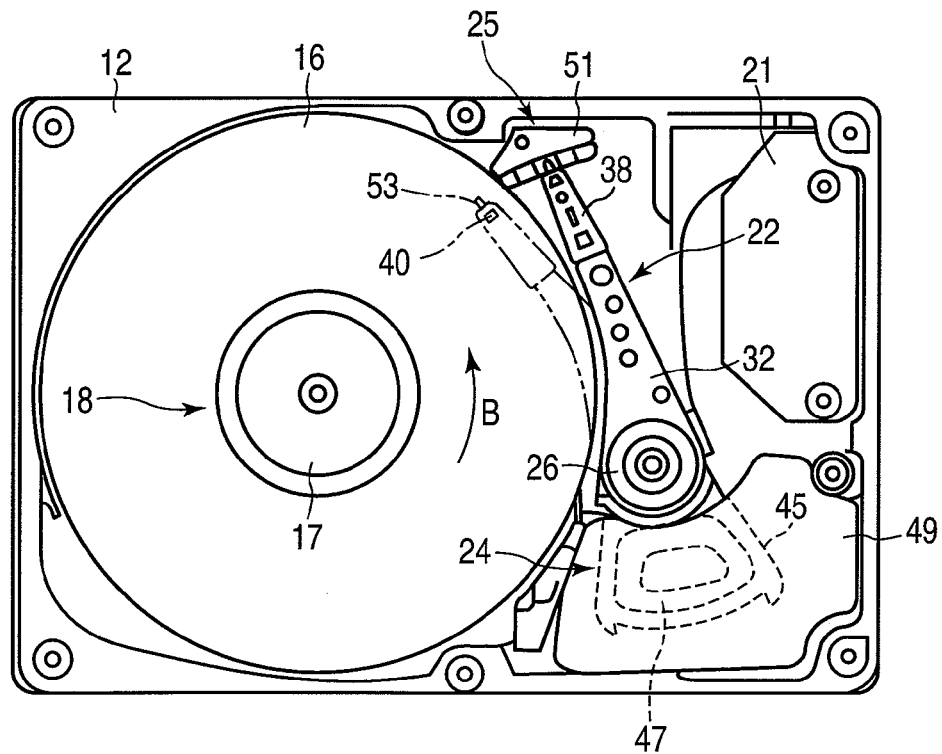
FIG. 1 is an exemplary plan view showing a hard disk drive according to a first embodiment.

FIG. 1 shows an inner structure of an HDD according to a first embodiment where a top cover of the HDD is detached. As shown in FIG. 1, the HDD comprises a casing which comprises a rectangular base 12 and the top cover unillustrated. The base 12 is open in its top surface. The top cover is secured to the base by plural screws and closes the open top surface of the base.

Provided in the base 12 are a magnetic disk 16 as a recording medium, a spindle motor 18, plural magnetic heads 40, a carriage assembly 22, a voice coil motor (VCM) 24, and a ramp load mechanism 25, and a board unit 21. The spindle motor 15 supports and rotates the magnetic disk. The plural magnetic heads 33 record/reproduce data onto/from the magnetic disk. The carriage assembly 22 supports the magnetic heads to be freely movable relative to the magnetic disk 16. The VCM 24 pivots and positions the carriage assembly 22. The ramp load mechanism 25 maintains the magnetic heads at a retracted position apart from the magnetic disk when the magnetic heads are moved to outermost periphery of the disk. The board unit 21 comprises a head IC.

An unillustrated printed circuit board is attached to an outer surface of a bottom wall of the base 12. The printed circuit board controls the spindle motor 18, VCM 24, and magnetic heads 40 through the board unit 21.

The magnetic disk 16 comprises magnetic recording layers on upper and lower surfaces of the disk. The magnetic disk 16 is engaged on an outer circumference of an unillustrated hub of the spindle motor 18, and is secured to the hub by a clamp spring 17. By driving the spindle motor 18, the magnetic disk 16 is rotated in an arrow direction B at a predetermined speed.

The carriage assembly 22 comprises a bearing unit 26 secured to the bottom wall of the base 12, and plural arms 32 extending from the bearing unit. The arms 32 are arranged parallel to the surfaces of the magnetic disk 16 at predetermined intervals, and extend in one same direction from the bearing unit 26. The carriage assembly 22 comprises elastically deformable suspensions 38 each having a shape of an elongated plate. Each suspension 38 is formed of, for example, a plate spring having a proximal end which is secured to a distal end of a corresponding arm 32 by spot welding or bonding and extends from the arm 32. Each suspension 38 may be formed integrally with respectively corresponding arms 32. Each suspension 38 and a corresponding arm 32 constitute a head suspension. The head suspensions and the magnetic heads 40 constitute a head gimbal assembly.

Figure 2:
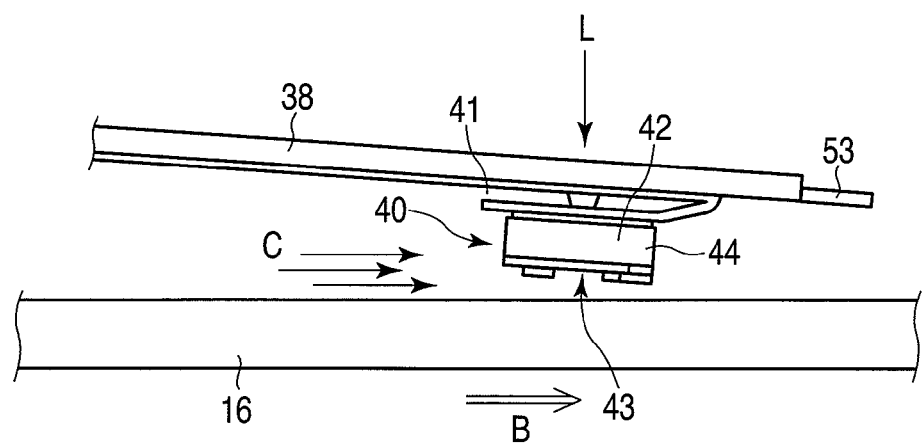
FIG. 2 is an exemplary side view showing a magnetic head section of the hard disk drive.

As shown in FIG. 2, each of the magnetic heads 40 comprises a substantially cuboid slider 42 and a read/write head section 44 provided on the slider. Each magnetic head 40 is secured to a gimbal spring 41 provided on a distal end part of a corresponding suspension 38. The magnetic heads 40 each are applied with a head load L directed to a corresponding surface of the magnetic disk 16 by elasticity of the suspensions 38.

As shown in FIG. 1, the carriage assembly 22 comprises a support frame 45 extending from the bearing unit 26 on an opposite side to the arms. The support frame supports a voice coil 47 which constitutes a part of the VCM 24. The support frame 45 is formed integrally with the outer periphery of the voice coil 47. The voice coil 47 is positioned between a pair of yokes 49 secured to the base 12. The voice coil 47, along with the yokes and an unillustrated magnet secured to one of the yokes, constitutes the VCM 24. When the voice coil 47 is electrically energized, the carriage assembly 22 pivots about the bearing unit 26, and the magnetic heads 40 are thereby moved to and positioned on desired tracks of the magnetic disk 16.

The ramp load mechanism 25 comprises a ramp 51 and tabs 53 (FIG. 2). The ramp 51 is provided on the bottom wall of the base 12, and is located outside the magnetic disk 16. The tabs 53 extend respectively from distal ends of the suspensions 38. When the carriage assembly 22 pivots to a retracted position outside the magnetic disk 16, each tab 53 engages with a ramp surface formed on the ramp 51 and is thereafter pulled up along a slope of the ramp surface, thereby unloading the magnetic heads 40.

Figure 3:
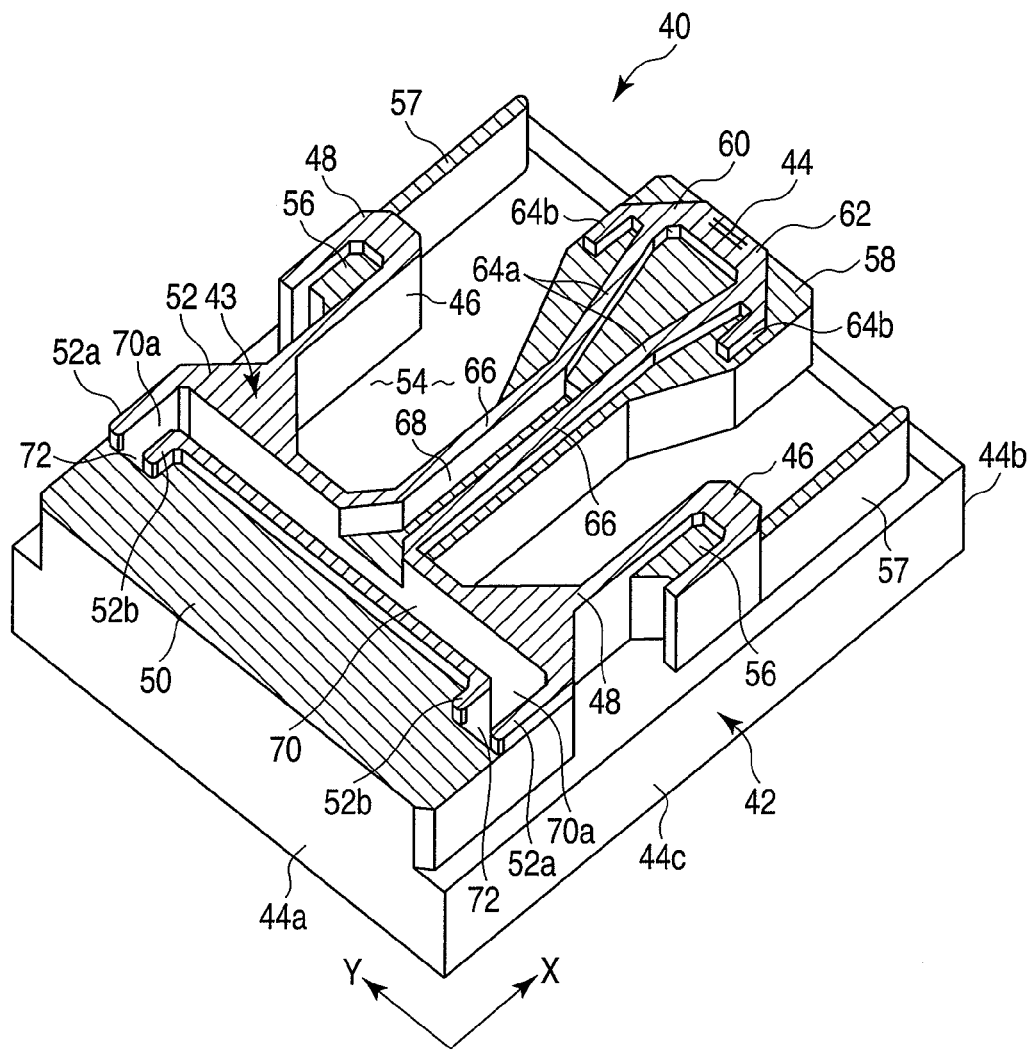
FIG. 3 is an exemplary perspective view showing a slider of the magnetic head in a supporting surface side thereof.
Figure 4:
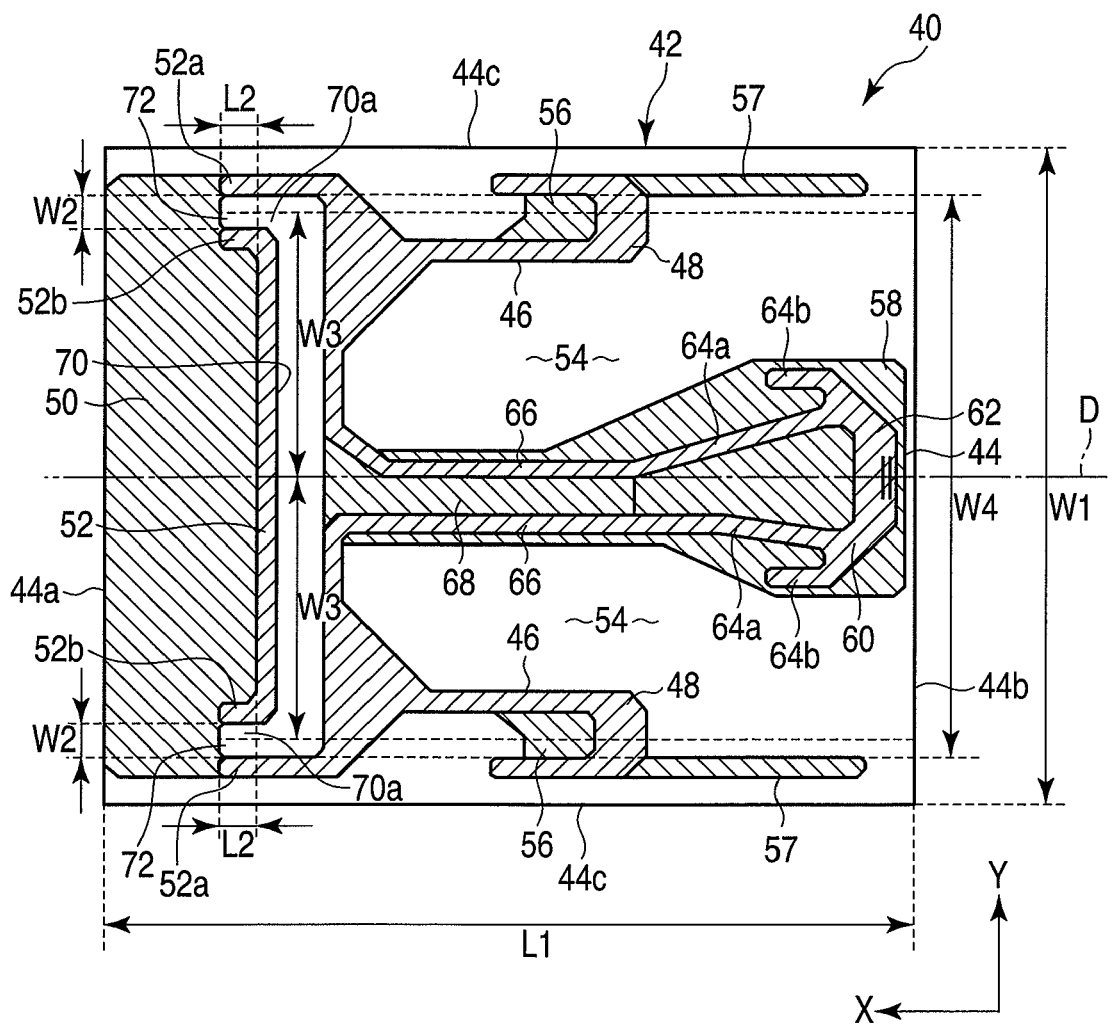
FIG. 4 is an exemplary plan view showing the supporting surface side of the slider.

Next, a detailed description will be made of a configuration of each magnetic head 40. FIG. 3 is an exemplary perspective view showing the slider of each magnetic head. FIG. 4 is an exemplary plan view of the slider, and FIG. 5 is an enlarged perspective view showing a pad part of the slider.

As is shown in FIGS. 2, 3 and 4, each magnetic head 40 comprises the substantially cuboid slider 42, which has a rectangular supporting surface (air bearing surface [ABS]) 43, an inflow end face 44a, an outflow end face 44b, and a pair of side faces 42c. The ABS 43 is configured to face a surface of the magnetic disk 16. The inflow and outflow end faces 44a and 44b extend at right angles to the supporting surface. The side faces 44c each extend at right angles to the supporting surface between the inflow and outflow end faces 44a and 44b.

A longitudinal direction of the supporting surface 43 is defined as a first direction X, as well as a transverse direction perpendicular thereto as a second direction Y. The slider 42 is configured as a so-called femto-slider, which has a length L1 of 1.25 mm or less, e.g., 0.85 mm in the first direction X, a width W1 of 1.0 mm or less, e.g., 0.7 mm in the second direction Y, and a thickness of 0.23 mm or less, e.g., 0.18 mm.

Each magnetic head 40 is configured as a flying head, and the slider 42 is caused to fly by airflow C (FIG. 2) that is produced between the disk surface and the supporting surface 43 in accordance with rotation of the magnetic disk 16. When the HDD operates, the supporting surface 43 of the slider is constantly opposed to the disk surface with a gap maintained from the disk surface. The airflow C is in the same direction as a direction of rotation B of the magnetic disk 16. The slider 42 is located in a manner that the first direction X of the supporting surface 43 is substantially the same as the direction of airflow C, in relation to the surface of the magnetic disk 16.

As shown in FIGS. 3 and 4, a negative-pressure cavity 54 as a recess is formed, ranging from a substantially central part of the supporting surface 43 to the outflow end side thereof. The negative-pressure cavity 54 opens toward the outflow end face 44b. The negative-pressure cavity 54 is formed to be 800 to 1500 nm deep, e.g., 1500 nm deep. By providing the negative-pressure cavity 54, a negative pressure can be produced on the central part of the supporting surface 43 at every feasible yaw angle for the HDD.

A substantially rectangular leading step 50 is formed at an inflow end part of the supporting surface 43. The leading step 50 is one-level lower than the supporting surface 43, e.g., 100 nm deep. The leading step 50 is protruded from the bottom surface of the negative-pressure cavity 54. The leading step 50 is positioned in the inflow side of the negative-pressure cavity 54 in relation to the airflow C.

The supporting surface 43 comprises a pair of side steps 46 which extend respectively along side edges of the supporting surface 43 and face each other with a gap maintained therebetween in the second direction Y. These side pads 46 are protruded from the bottom surface of the negative-pressure cavity 54. The side pads 46 protrude from the leading step 50 to a downstream end side of the slider 42. Substantial halves of the side pads 46 in the outflow end side are formed to be wider in the second direction Y than the other halves in the inflow end side.

The leading step 50 and the pair of side pads 46 are provided to be symmetrical about the center axis of the slider 42, and are formed in a substantial U-shape which is closed as a whole in an upstream side and is open toward a downstream side. Further, the pair of enclosures 48, 73, 74, 75, 76, and 77 define the negative-pressure cavity 54.

To maintain a pitch angle of each magnetic head 40, leading pads 52 protrudes from the leading step 50, in order to support the slider 42 by an air film. The leading pads 52 continuously extend throughout an whole area of the reading step in width directions thereof, in the second direction Y. The leading pads 52 are formed at a position shifted from the inflow end surface 44a of the slider 42 to a downstream side thereof.

A side pad 48 is formed on each of the side steps 46, and is connected to the leading pads 52. The leading pads 52 and side pads 46 are formed to be substantially flat and form the supporting surface 43. A concave 56 is formed in each side pad 48. Each concave 56 is open toward a surface of the magnetic disk and toward the inflow end of the supporting surface 43. Each concave 56 is formed to be 180 nm deep.

Also on the supporting surface 43 of the slider, there are formed a pair of skirts 57 each of which linearly extends in the first direction X from the side parts 46 to vicinity of the outflow end of the slider. Each skirt 57 is formed to be deeper than the side steps 46, and protrudes from a bottom surface of the negative-pressure cavity 54. Each skirt 57 is formed, for example, to be 100 to 200 nm deep, e.g., 180 nm deep from the supporting surface 43.

The slider 42 comprises a trailing step 58 formed on an outflow end part of the supporting surface 43 in relation to the direction of airflow C. The trailing step 58 is protruded from the bottom surface of the negative-pressure cavity 54, and is formed to be 50 to 250 nm deep, e.g., 180 nm deep from the supporting surface 43. Further, the trailing step 58 is positioned in a downstream side of the negative-pressure cavity 54 in the direction of airflow C, and in a substantial center of the supporting surface 43 in the second direction Y. Further, the trailing step 58 is slightly shifted to the side of the inflow end surface 44a from the outflow end surface 44b of the slider 42.

The trailing step 58 has an upper surface opposed to a surface of the magnetic disk 16. A trailing pad 60 which supports the slider 42 by an air film is protruded from an upper surface of the trailing step 58. The trailing pad 60 is formed flush with the leading pads 52 and side pads 48, and has a surface which constitutes the supporting surface 43.

The trailing pad 60 comprises a base part 62 and four ribs 64a and 64b. The base part 62 is provided at the outflow end part of the trailing step 58, and the four ribs 64a and 64b extend from the base part in the second direction Y. Of the trailing step 58, the base part 62 is provided on the center axis D in the outflow end side, and is positioned at a substantial center in the second direction Y. Two ribs 64 provided in two sides of the center axis D extend toward the inflow end of the trailing step 58 in the first direction X. Outer two ribs 64b are shorter than the ribs 64a, and extend in the first direction X toward an inflow side of the trailing step 58. Of the trailing step 58, a part positioned between the two long ribs 64a is formed one-level lower.

The head section 44 of each magnetic head 40 comprises recording and reproduction elements which record and reproduce data on and from the magnetic disk 16. These recording and reproduction elements are embedded in a downstream end part of the slider 42 in relation to the direction of airflow C, e.g., in the trailing step 58 in this embodiment. The recording and reproduction elements are provided so as to expose lower ends of the elements to the base part 62 of the trailing pad 60.

The slider 42 is formed as a center-rail-type slider. Specifically, the slider 42 comprises center rails 66 which extend in the first direction X from the leading step 50 to the trailing step 58. The center rails 66 are continuous to the ribs 64b of the trailing pad 60. A guide groove 68 is formed between the center rails 62. The guide groove 68 extends from the leading step 50 to the trailing step 58 in the first direction X. The guide groove 68 is formed to be shallower than the negative-pressure cavity 54 and deeper than the trailing step 58.

As shown in FIGS. 3 and 4, an intake groove 70 is formed in the leading pads 52. The intake groove 70 is deeper than the guide groove 68 and is substantially as deep as the negative-pressure cavity 54. The intake groove 70 extends substantially throughout the whole width of the leading pads 52 in the second direction Y. The intake groove 70 communicates with the guide groove 68 at a substantial center part of the groove in the second direction Y. Two end parts 70a of the intake groove 70 are open to the inflow end of the leading pads 52, and define the openings 72. The intake groove 70 and opening 72 each are formed to have a width W2.

The leading pads 52 comprise a pair of first ribs 52a and a pair of second ribs 52b. The first pair of first ribs 52a is positioned respectively in two end sides in the second direction Y, and extends in the first direction X. The second ribs 52b are positioned closer to the center axis D than the first ribs 52a, and extend in the inflow side in the first direction X. The first ribs 52a and second ribs 52b extend to the openings 72 along two sides of the end parts 70a of the intake groove 70. The first and second ribs 52a and 52b are formed to have lengths L2 in the first direction X.

According to the HDD configured as described above, each magnetic head 40 is caused to fly by the airflow C which is produced between a disk surface and the supporting surface 43. Thus, when the HDD operates, the supporting surface 43 of the slider 42 is constantly opposed to the disk surface with a gap maintained from the disk surface. As shown in FIG. 2, each magnetic head 40 flies in an inclined attitude in which the read/write gap of the head section 44 is closest to the disk surface.

Since the negative-pressure cavity 54 is provided in the supporting surface 43 of the slider 42, each magnetic head 40 can produce a negative pressure on the central part of the supporting surface 43 at every feasible yaw angle for the HDD. The airflow is introduced into the intake groove 70 from the openings 72, and further to the side of the trailing step 58 through the guide groove 68. The airflow increases the positive pressure generated by the trailing pad 60, and the flying height of the head section 44 can be stabilized. At this time, flow channels which intake the airflow from inner and outer peripheral sides can be ensured since the intake groove 70 and the openings 72 positioned at two ends in the second direction are provided. Therefore, the airflow introduced into the guide groove 68 can be adjusted to be substantially constant, regardless of radial positions of the magnetic head 40. In this manner, variation of a flow rate of the airflow which is caused by variation in skew angle of the magnetic head 40 and in circumferential speed of the magnetic disk can be suppressed, and the head flying height during reduction of pressure can be reduced. That is, variation of the flying height at reduced pressure and profiles of the flying height can be flattened. Accordingly, high performance of writing/reading data can be achieved regardless of radial positions, and magnetic heads and an HDD comprising the heads can be obtained with improved reliability and stability.

The present inventor prepared a magnetic head 40a according to a comparative example 1 shown in FIG. 5, and a magnetic head 40b according to a comparative example 2 shown in FIG. 6. The present inventor compared flying height characteristics for the magnetic heads 40a and 40b according to the comparative examples 1 and 2 and for a magnetic head 40 according to the first embodiment described above. As shown in FIG. 5, the magnetic head 40a according to the comparative example 1 comprises an intake groove 70 formed in a leading pad 52, and does not comprise openings which communicate with the intake groove. As shown in FIG. 6, the magnetic head 40b according to the comparative example 2 comprises an intake groove 70 formed in a leading pad 52, and does not comprise openings which communicate with the intake groove. A concave 74 is formed in an upper surface of the leading step 50. The concave 74 extends in width directions of the leading step 50. Except for a feature as described above, each of the magnetic heads in the comparative examples 1 and 2, have the same configuration as the magnetic head 40 in the first embodiment.

Figure 7:
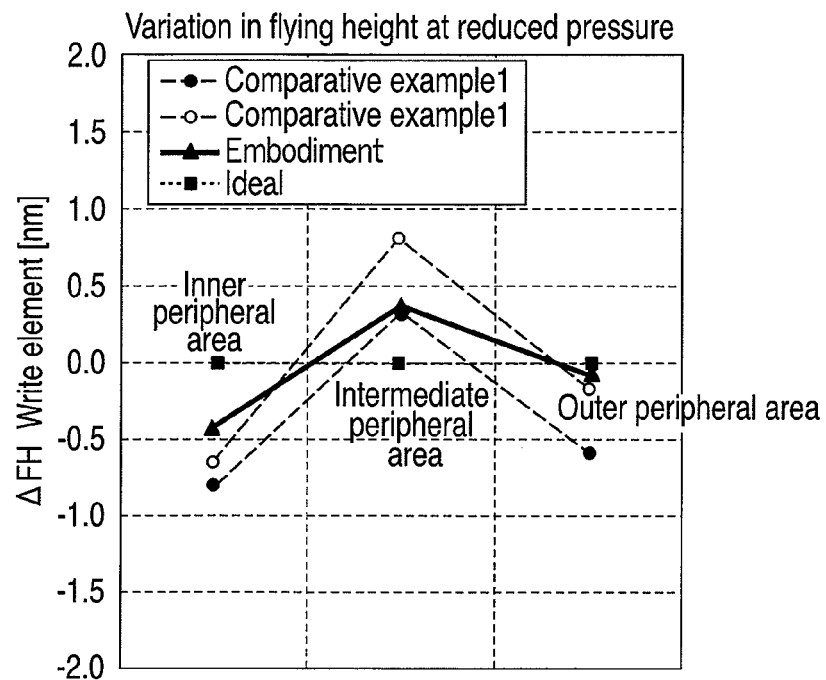
FIG. 7 is an exemplary graph showing variation in flying height, compared between magnetic heads according to the first embodiment and the comparative examples 1 and 2.
Figure 8:
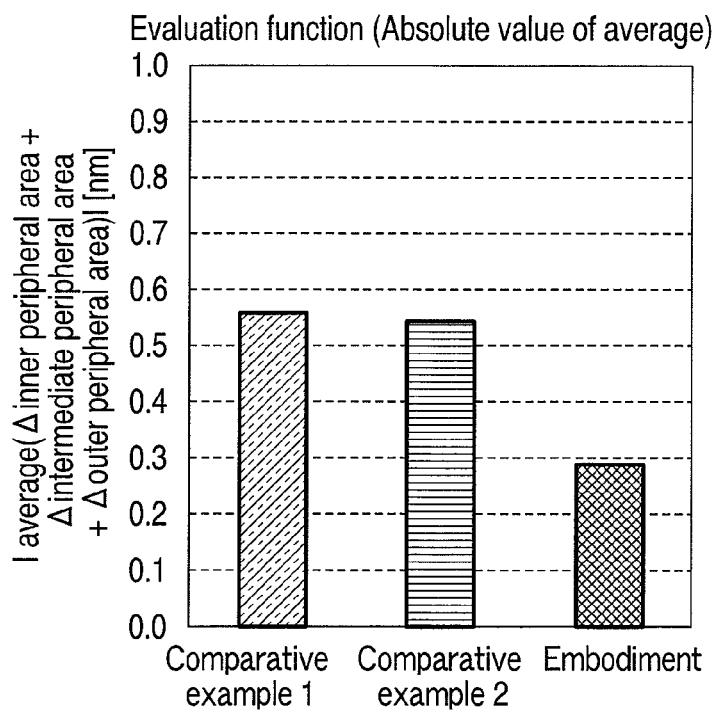
FIG. 8 is an exemplary graph showing evaluation of averaged flying heights, compared between the magnetic heads according to the first embodiment and the comparative examples 1 and 2.

Variation in flying height in accordance with change in air pressure was simulated for the magnetic heads 40a and 40b according to the comparative examples 1 and 2, and for the magnetic head 40 according to the first embodiment. FIGS. 7 and 8 show results of the simulation. Analysis conditions were use of an HDD comprising a magnetic disk of diameter 1.8 inches, a rotational speed of 4,200 rpm, and an air pressure of 0.43 atm. Although air pressure is specified to be 0.7 atm according to the specifications of an HDD for use in a conventional personal computer, the present analysis employs an air pressure of 0.7 atm as a pressure reduction condition.

As shown in FIG. 7, the magnetic head 40 according to the present embodiment resulted in variation in flying height as follows in accordance with pressure reduction, in comparison with the magnetic head 40a of the comparative example 1. The variation in flying height was substantially equal to that of the comparative example 1 in an intermediate peripheral area of the magnetic disk. In contrast, increase in flying height in the inner and outer peripheral areas of the magnetic disk was found to be reduced by about 50%. That is, by suppressing increase in flying height in the intermediate peripheral area of the magnetic disk at a reduced pressure, decrease in flying height in the inner and outer peripheral areas of the magnetic disk is suppressed, with the writing characteristics maintained substantially equal to the comparative example 1. Accordingly, a contact margin between a recording element part and the magnetic disk can be improved, and reliability of the HDD can be improved.

Otherwise, when pressure reduction characteristics are improved by providing a concave 74 in the leading step 50, the flying height in the intermediate peripheral area of the magnetic disk tends to increase under a reduced pressure, and magnetic spacing is lost thereby deteriorating the writing characteristics.

As shown in FIG. 8, the magnetic head according to the present embodiment has a smaller absolute value of an averaged flying height between the inner, intermediate, and outer peripheral areas than the comparative examples 1 and 2. Therefore, variation in flying height depending on the radial position relative to the magnetic disk is found to be small.

Further, in order to verify an effect of reducing variation in flying height of magnetic heads, the present inventor carried out a simulation of variation in flying height which is caused by pressure reduction, while variously changing widths and lengths of parts forming a slider and positions of openings.

The following changes were made.

1) Openings 72 each were supposed to have a width W2. As shown in FIGS. 9A, 9B, 9C, 9D, 9E, 9F, and 9G, the width W2 was set to zero (not open) and to the same as a width of the intake groove 70, and was further increased in five steps (seven parameters).

Figure 10A:
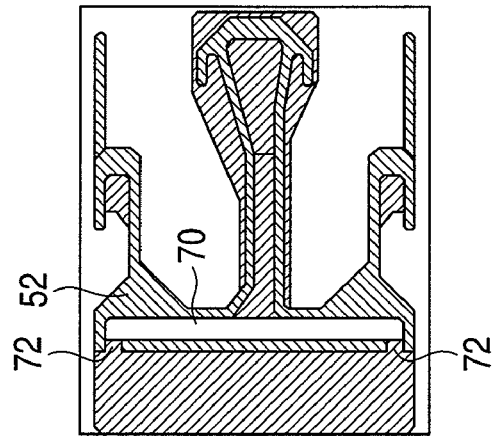
FIGS. 10A, 10B and 10C are exemplary plan views showing plural sliders whose openings are provided at respectively different positions in leading pads.
Figure 10B:
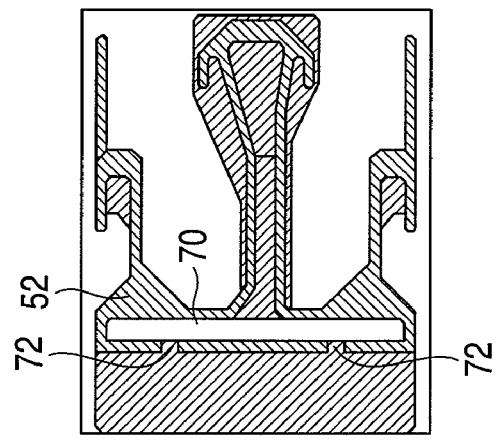
Figure 10C:
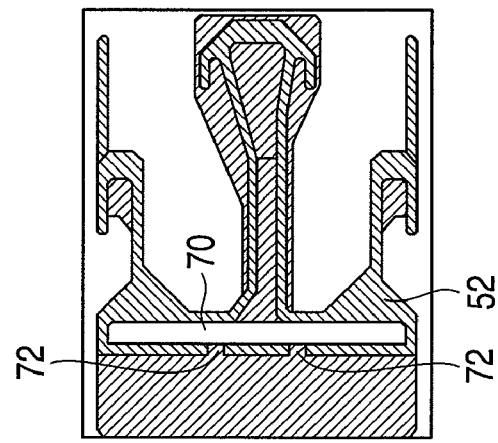

2) Positions to form the openings 72 were set to the same positions as in the first embodiment, positions shifted inside from two ends in width directions, and positions shifted to a side of the center axis of the slider, as shown in FIGS. 10A, 10B, and 10C (three parameters). As shown in FIG. 4, where the whole width of the slider is W1 and a distance from the center axis D of the slider to the center of each opening 72 is W3, the openings 72 shown in FIG. 10A were provided at the positions as follows. Openings 72 of a slider shown in FIG. 10A were positioned such that the distance from the center axis D is 40% of the whole width of the slider (W3/W1). Openings 72 of a slider shown in FIG. 10B were positioned such that the distance from the center axis D is 23% of the whole width of the slider (W3/W1). Openings 72 of the slider shown in FIG. 10C were positioned such that the distance from the center axis D is 11% of the whole width of the slider (W3/W1).

3) First rib 52a provided at two end parts of leading pads 52 of a slider were each supposed to have a length L2. The length L2 was gradually increased in six steps from zero and finally extended to inflow ends of the leading step, as shown in FIGS. 11A, 11B, 11C, 11D, 11E, 11F, and 11G (S: seven parameters).

4) Second ribs 52b provided at two end parts of leading pads 52 of a slider were each supposed to have a length L2. The length L2 was gradually increased in four steps from zero and finally extended to inflow ends of the leading step, as shown in FIGS. 12A, 12B, 12C, 12D, and 12E (I: five parameters).

5) First ribs 52a and second ribs 52b provided at two end parts of leading pads 52 of a slider were each supposed to have a length L2, the length L2 was gradually increased in four steps from zero and finally extended to inflow ends of the leading step, as shown in FIGS. 13A, 13B, 13C, and 13D (S+I: five parameters).

6) First ribs 52a and second ribs 52b provided at two end parts of leading pads 52 of a slider were L2 and two end parts 70a of the intake groove 70 were each supposed to have a length L2, the length L2 was gradually increased in five steps from zero and finally extended to the inflow ends of the leading step, as shown in FIGS. 14A, 14B, 14C, 14D, and 14E (S+I+C: six parameters).

Figure 17:
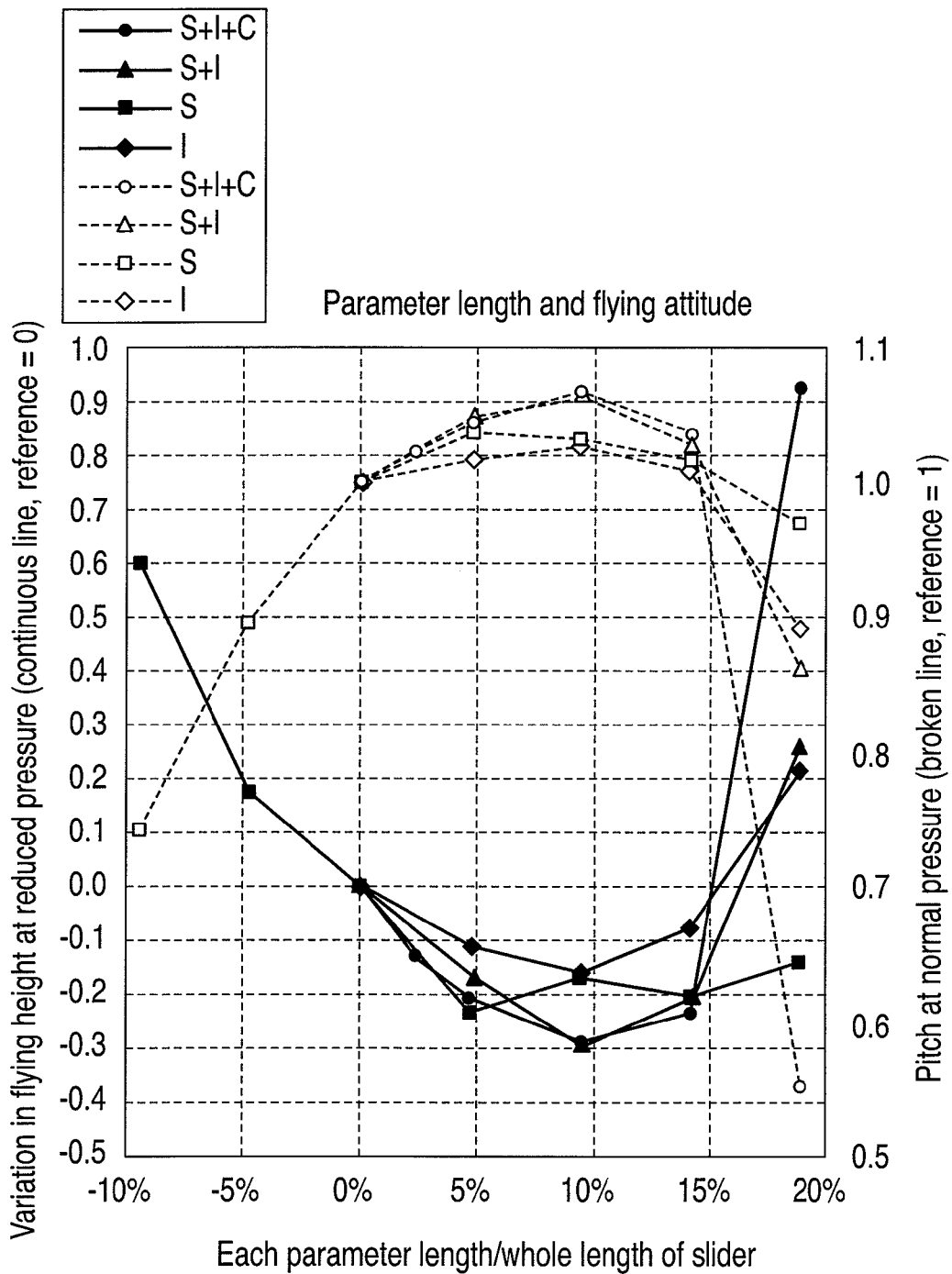
FIG. 17 is an exemplary graph showing a relationship between extending lengths of two end parts and an intermediate part in width directions in a leading pad, extending lengths of two end parts of an intake groove, flying attitudes of a slider, and flying pitches thereof.

For the foregoing six cases, results of simulating variation in flying height of the magnetic heads are shown in FIGS. 15, 16, and 17.

Analysis results are obtained by firstly obtaining flying attitudes of each slider at a normal pressure and a reduced pressure (0.43 atm) and by calculating an average value among values at respective radial positions on a magnetic disk (by the same evaluation function as shown in FIG. 8). Further, ratios between the analysis results were obtained for cases of adopting a reference shape and allocating the foregoing parameters.

As a result, as shown in FIG. 17, there is found that variation in flying height at reduced pressure can be reduced by about 0.3 nm in comparison with a slider comprising no openings, by setting the length L2 to about 9% of the whole length L1 of each slider in the following two cases. One is the case where openings 72 were provided in the leading pad 52 and both the first ribs 52a and second ribs 52b were extended (case of S+I). The other one is the case where two end parts 70a of the intake groove 70 were also extended together (case of S+I+C).

Accordingly, the followings resulted from viewpoints of performance at a reduced pressure and maintenance of pitch attitudes.

A) As shown in FIG. 15, the width W2 of each opening 72 of leading pads 52 is to be 35% (=W2/W1) or less in relation to the whole width W1 of a slider.

B) As shown in FIG. 16, variation in flying height of a slider at a reduced pressure is smaller and flying attitudes are more stable when each of positions where the openings 72 of leading pads 52 are formed is to be at 23 or 40% of the whole width W1 of a slider in relation to the slider center axis D, than when the position is at 11% (=W3/W1). Hence, the forming position of each opening 72 of leading pads is to be distant by 23% (W3/W1) of the whole width W1 of the slider from the slider center axis D.

C) As shown in FIG. 17, when the length L2 of each first rib 52a of leading pads and the length L2 of each of two end parts 70a of an intake groove 70 are both to be several to 15% or less (=L2/L1) of the whole length L1 of a slider.

Next, magnetic heads in HDDs according to other embodiments will be described.

Figure 18:
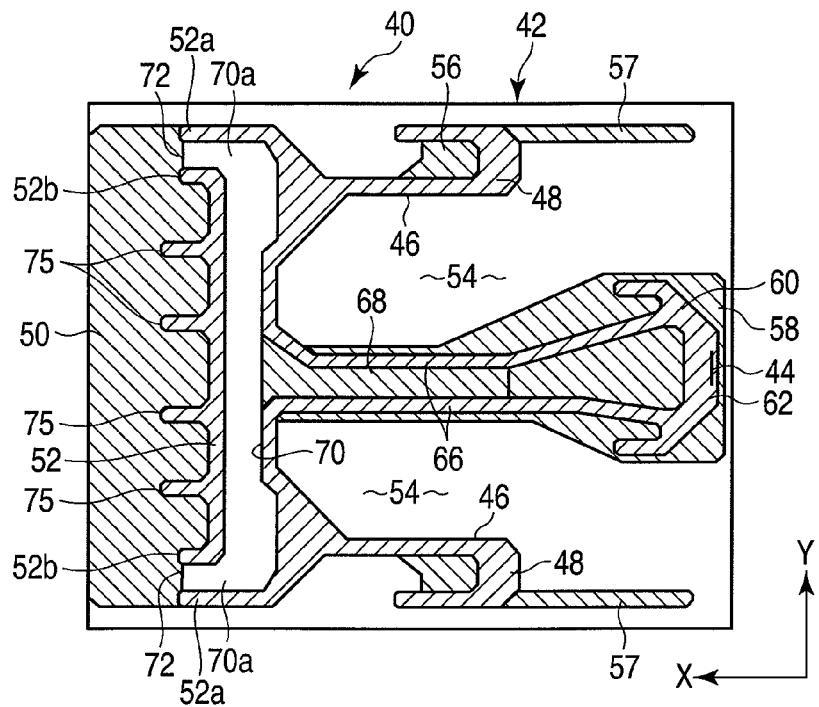
FIG. 18 is an exemplary plan view showing a slider in a magnetic head according to a second embodiment.

FIG. 18 shows a magnetic head 40 in an HDD according to a second embodiment. According to the second embodiment, a leading pad 52 of a slider 42 comprises plural ribs 75 which extend from an inflow side edge of the leading pad 52 toward an inflow end of the slider in a first direction X. The ribs 75 are provided at a predetermined interval maintained between each other in a second direction Y. Except a feature as described above, the slider 42 has the same configuration as that in the first embodiment described above. The same parts as in the first embodiment are denoted at the same reference symbols as well, and detailed descriptions of such parts will be omitted from here.

According to the magnetic head 40 according to the second embodiment, the same operation and effects as the first embodiment described above can be obtained. In addition, airflow which flows in obliquely to the slider can be caught by providing the plural ribs 75, and a positive pressure can be thereby generated. Therefore, a more stable flying height can be obtained even when the magnetic head is positioned in an inner or outer peripheral area of a magnetic disk.

Figure 19:
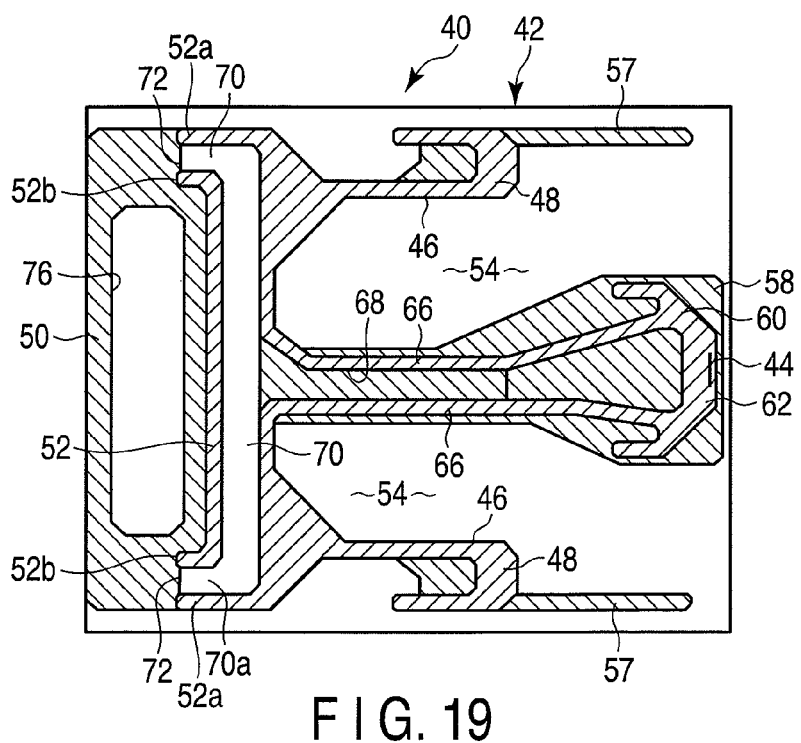
FIG. 19 is an exemplary plan view showing a slider in a magnetic head according to a third embodiment.

FIG. 19 shows a magnetic head 40 in an HDD according to a third embodiment. According to the third embodiment, a concave 76 is formed in an upper surface of leading pads 52 of a slider 42. The concave 76 extends in a width direction of the leading step. Except a feature as described above, the slider 42 has the same configuration as that in the first embodiment described above. The same parts as in the first embodiment are denoted at the same reference symbols as well, and detailed descriptions of such parts will be omitted from here.

According to the magnetic head 40 according to the third embodiment, the same operation and effects as the first embodiment described above can be obtained. In addition, pressure reduction characteristics can be more improved by providing the concave 74 in the leading step 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Shapes and dimensions of the leading step, trailing step, intake groove, and pads are not limited to those described in the above embodiments but may be modified according to necessity. In addition, the present invention is not limited to femto-sliders but is also applicable to pico-sliders, pemto-sliders, and sliders of greater size; and the number of magnetic disks in a disk device is not limited to one.

What is claimed is:

1. A head comprising:
a slider comprising a supporting surface opposed to a surface of a rotatable recording medium, and
a head section on the slider, configured to perform recording of data on the recording medium and reproduction of data from the recording medium,
wherein the supporting surface of the slider comprises a leading step in an inflow side of an airflow,
a leading pad on the leading step,
a negative-pressure cavity in a downstream side of the leading pad in relation to the airflow,
a trailing step in an outflow end side of the airflow and provided with the head section,
a center rail extending from the leading step to the trailing step,
a guide groove in the center rail, configured to guide the airflow to the trailing step, and
an intake groove formed in the leading pad, extending in a direction transverse to the airflow, communicating with the guide groove, and comprising two end parts in its longitudinal direction, the two end parts extending in a direction of the airflow and forming openings open to the inflow side of the leading pad, and
the leading pad comprises first ribs extending along the end parts of the intake groove to the openings, and the first ribs and the end parts of the intake groove have a length of about 2% to about 15% of the whole length of the slider.

2. The head of claim 1, wherein
the leading pad comprises second ribs extending along the end parts of the intake groove to the openings and opposed to the first ribs over the intake groove, wherein the second ribs have a length of about 2% to about 15% of the whole length of the slider.

3. The head of claim 1, wherein
the openings of the leading pad are positioned at a distance of about 20% or more of a whole width of the slider from the center of the slider.

4. The head of claim 1, wherein
the openings of the leading pad have a width of about 4% to about 35% of a whole width of the slider.

5. The head of claim 1, wherein
the leading pad comprises plural ribs extending from an inflow side edge of the leading pad toward an inflow side end of the slider in the direction of the airflow.

6. The head of claim 1, wherein
the slider comprises a concave formed in the leading step.

7. The head of claim 1, wherein
the slider comprises a pair of side steps extending in the direction of the airflow from the leading step to the outflow end side.

8. A disk device comprising:
a drive section configured to support and rotate a disk-shaped recording medium;
a head configured to record data on the recording medium and reproduce data from the recording medium; and
a head actuator supporting the head,
wherein the head comprises a slider comprising a supporting surface opposed to a surface of a rotatable recording medium, and
a head section on the slider, configured to perform recording of data on the recording medium and reproduction of data from the recording medium, and
wherein the supporting surface of the slider comprises a leading step in an inflow side of airflow;
a leading pad on the leading step;
a negative-pressure cavity in a downstream side of the leading pad in relation to airflow;
a trailing step in an outflow end side of the airflow and provided with the head section;
a center rail extending from the leading step to the trailing step;
a guide groove in the center rail, configured to guide the airflow to the trailing step; and
an intake groove formed in the leading pad, extending in a direction transverse to the airflow, communicating with the guide groove, and comprising two end parts in its longitudinal direction, the two end parts extending in a direction of the airflow and forming openings open to the inflow side of the leading pad, and
the leading pad comprises first ribs extending along the end parts of the intake groove to the openings, and the first ribs and the end parts of the intake groove have a length of about 2% to about 15% of the whole length of the slider.

9. The disk device of claim 8, wherein
the leading pad comprises second ribs extending along the end parts of the intake groove to the openings and opposed to the first ribs over the intake groove, wherein at least some of the second ribs have a length of about 2% to about 15% of the whole length of the slider.

10. The disk device of claim 8, wherein
at least some of the openings of the leading pad are positioned at a distance of about 20% or more of a width of the slider from the center of the slider.

11. The head disk device of claim 8, wherein
at least some of the openings of the leading pad have a width of about 4% to about 35% of a width of the slider.

12. The disk device of claim 8, wherein
the leading pad comprises ribs extending from an inflow side edge of the leading pad toward an inflow side end of the slider in the direction of the airflow.

13. The disk device of claim 8, wherein
the slider comprises a concave formed in the leading step.

14. The disk device of claim 8, wherein
the slider comprises a pair of side steps extending in the direction of the airflow from the leading step to the outflow end side.

* * * * *